(12) United States Patent
Fukunaga et al.

(10) Patent No.: US 7,748,227 B2
(45) Date of Patent: Jul. 6, 2010

(54) HEAT-PUMP-TYPE HOT WATER SUPPLY APPARATUS

(75) Inventors: Toshikatsu Fukunaga, Osaka (JP); Kazuhito Nakatani, Shiga (JP)

(73) Assignee: Panasonic Corporation, Osaka (JP)

( * ) Notice: Subject to any disclaimer, the term of this patent is extended or adjusted under 35 U.S.C. 154(b) by 284 days.

(21) Appl. No.: 11/573,271

(22) PCT Filed: Sep. 16, 2005

(86) PCT No.: PCT/JP2005/017164

§ 371 (c)(1),
(2), (4) Date: Feb. 6, 2007

(87) PCT Pub. No.: WO2006/030903

PCT Pub. Date: Mar. 23, 2006

(65) Prior Publication Data

US 2007/0214816 A1    Sep. 20, 2007

(30) Foreign Application Priority Data

Sep. 16, 2004    (JP) .............................. 2004-269611

(51) Int. Cl.
*F25B 27/00* (2006.01)
(52) U.S. Cl. ........................ 62/238.6; 62/506
(58) Field of Classification Search ..... 62/238.6–238.7, 62/506, 259.1
See application file for complete search history.

(56) References Cited

U.S. PATENT DOCUMENTS

| 2,516,093 | A | * | 7/1950 | Ruff | ............................... | 62/77 |
| 2,696,085 | A | * | 12/1954 | Ruff | ............................ | 62/184 |
| 4,314,456 | A | * | 2/1982 | Harnish | ........................ | 62/181 |
| 4,316,367 | A | * | 2/1982 | Yaeger et al. | .............. | 62/238.6 |

(Continued)

FOREIGN PATENT DOCUMENTS

JP        58-158448        9/1983

(Continued)

OTHER PUBLICATIONS

Gommori et al., "Development of High Efficiency and Instantaneous Heat Pump Water Heating System Using R 410A", 2004, pp. 23-28.

*Primary Examiner*—William E Tapolcai
(74) *Attorney, Agent, or Firm*—Pearne & Gordon LLP

(57) ABSTRACT

To provide a compact and well serviceable heat pump water boiler.

The heat pump water boiler is constituted to have a body unit (1) by integrating: a refrigerant cycle, in which a compressor (2), a radiator (3), a radiator (4), pressure reducing means (5) and an evaporator (6) are connected; a blower fan (8) for blowing wind to the evaporator (6); a hot-water supplying water-refrigerant heat exchanger (9) acting integrally with the radiator (3) for converting water into hot water; a hot-water supplying circulation water pump (15) for feeding water to the hot-water supplying water-refrigerant heat exchanger (9); a bath warming/heating water-refrigerant heat exchanger (17) acting integrally with the radiator (4) for further raising the temperature of the hot water of the bath tab; a bath water circulating pump (18) for circulating the hot water of the bath; and hot-water reserving tank (10) for reserving the hot water. The body unit (1) is provided with an extending portion (40*a*) at a jacket back (40) confronting the hot-water reserving tank (10).

6 Claims, 6 Drawing Sheets

U.S. PATENT DOCUMENTS

| | | | |
|---|---|---|---|
| 4,321,797 A * | 3/1982 | Yaeger et al. | 62/79 |
| 5,052,187 A * | 10/1991 | Robinson, Jr. | 62/79 |
| 5,984,198 A * | 11/1999 | Bennett et al. | 237/2 B |
| 6,604,376 B1 * | 8/2003 | Demarco et al. | 62/324.1 |
| 2006/0191276 A1 * | 8/2006 | Sienel et al. | 62/238.6 |
| 2006/0191288 A1 * | 8/2006 | Radermacher et al. | 62/510 |

FOREIGN PATENT DOCUMENTS

| | | |
|---|---|---|
| JP | 2003-279133 | 10/2003 |
| JP | 2005-337597 | 12/2005 |

* cited by examiner

PRIOR ART

PRIOR ART

PRIOR ART

HEAT-PUMP-TYPE HOT WATER SUPPLY APPARATUS

TECHNICAL FIELD

The present invention relates to a heat pump type water boiler.

BACKGROUND ART

The water boiler employed in the related art has used gases or petroleum as its fuel, the combustion heat of which heats civil water. This water boiler is advantageous in its quick heating, but has problems that the fuel such as gases or petroleum so that its supply is essential, that the exhaust gas after the combustion is released to contaminate the atmosphere, that an instability is always incorporated by the combustion, and that the combustion makes noises. Especially in the wholly electrified house or condominium increasing year by year and using the electricity for all energy sources, there is no way of supplying the fuel. It is, therefore, the current practice that the case, in which the water boiler cannot be used, is increasing.

Thus, there has been developed a heat pump water boiler of a reservation type provided with a hot-water reserving tank. This heat pump water boiler gradually comes into wide use, because it can solve the problems of the combustion type water boiler and because it has advantages that the water boiler can be easily installed without any new infrastructure in the wholly electrified house or condominium, that the water boiler is of the heat pump type and has a high heat efficiency to keep a capacity of three times or more to the input, and that the water boiler is enabled to reserve hot water in a reservoir tank by using the inexpensive late-night electric power for the run, thereby to lower the running cost.

From the housing problems of recent years, however, more and more demanders have to despair of the installation of the heat pump water boiler because of lack of installation space.

For those demanders, there has also been developed a water boiler, which can be installed in a narrow space because the heat pump unit and the hot-water reserving tank unit are integrated.

This water boiler is exemplified by the heat pump water boiler (RHK-23BAV of Hitachi), as disclosed in Non-Patent Document 1.

FIG. 4 is a circuit configuration diagram of such heat pump water boiler, and FIG. 5 is a schematic configuration diagram of the heat pump water boiler shown in FIG. 4.

The heat pump water boiler shown in FIG. 4 comprises: a refrigerant cycle constituted to include compressors 120 and 121, water-refrigerant heat exchangers 122 and 123, pressure reducing valves 124 and 125, evaporators 126 and 127 and blowers 128 and 129; and a hot-water supplying cycle including a hot-water reserving tank 130, a mixing valve 131, a solenoid valve 132, a hot-water supplying circulation water pump 133 and a bath warming/heating circulation water pump 134 connected through pipes. The hot water is generated in the refrigerant cycle and is directly supplied to a faucet 135 and a bath tab 136, and reserved hot water is supplied from the hot-water circuit. Moreover, this heat pump water boiler is constituted into an integral type housing the refrigerant cycle and the hot-water supplying cycle wholly in one unit, as shown in FIG. 5.

In a heat pump water boiler disclosed in Patent Document 1, on the other hand, the refrigerant unit is arranged over the hot-water reserving unit so that the constitution can be installed in a narrow space.

FIG. 6 is a schematic configuration diagram of such heat pump water boiler.

Non-Patent Document 1: Refrigeration, Edition of March, 2004, Vol. 29, No. 917, pgs. 23-28

Patent Document 1: JP-A-58-158448

DISCLOSURE OF THE INVENTION

Problems that the Invention is to Solve

However, the heat pump water boiler, as disclosed in Non-Patent Document 1, is constituted into the integral type, in which the refrigerant cycle and the hot-water supplying cycle are wholly housed in one unit, but its size is seriously big because it includes the large-sized refrigerant cycle portion and the tank unit portion. At the same time, the refrigerant cannot be removed in site when the refrigerant cycle goes out of order. The boiler entirety integrated with the hot-water reserving tank has to be returned to the factory so that its maintainability is very poor.

Moreover, the big size makes the installation seriously difficult on the veranda or the like of the condominium so that the merit of the integral type cannot always be exhibited.

In the heat pump water boiler, as disclosed in Patent Document 1, on the other hand, the installation area can be reduced by arranging the refrigerating cycle over the hot-water reserving tank. However, the heat pump water boiler cannot be remedied in site when the refrigerator circuit parts go out of order. It is also necessary to bring back the boiler entirety with the hot-water reserving tank to the factory.

The present invention has been conceived to solve those problems, and has an object to reduce the size of the boiler body by arranging the parts at the optimum in the boiler inside thereby to enlarge the options of the installation place, and to improve the setting and maintaining properties.

Means for Solving the Problems

According to the invention as set forth in claim 1, there is provided a heat pump water boiler having an integral housing comprising a refrigerant circulating circuit for circulating a refrigerant, a water-refrigerant heat exchanger for exchanging heat with a radiator of the refrigerant circulating circuit, and a hot-water reserving tank for reserving hot water heated.

According to the invention, there is provided a heat pump water boiler having an integral housing comprising a refrigerant circulating circuit comprising a closed circuit by connecting a compressor, a radiator, pressure reducing means and an evaporator, thereby to circulate a refrigerant, a blower fan for blowing wind to the evaporator, a water-refrigerant heat exchanger for exchanging heat with the radiator, an inlet line connected to the water-refrigerant heat exchanger for supplying civil water, and a hot-water line connected for supplying the heated hot water to a hot-water terminal such as a faucet or a shower. The heat pump water boiler is characterized in that a portion of the housing arranged flush with the suction face of the evaporator includes an extending portion.

According to the invention, the heat pump water boiler is characterized in that the extending portion has extension size thereof so set to the minimum size or less as not to deteriorate the heat exchanging performance of the evaporator.

According to the invention, the heat pump water boiler is characterized in that the hot-water reserving tank is arranged to confront the extending portion formed at a portion of the housing.

According to the invention, the heat pump water boiler is characterized in that the extending portion has a contour substantially identical to that of the hot-water reserving tank.

According to the invention, the heat pump water boiler is characterized in that an insulator is interposed between the extending portion and the hot-water reserving tank.

According to the invention, the heat pump water boiler, is characterized in that a carbonic acid gas is used as the refrigerant.

ADVANTAGE OF THE INVENTION

According to the invention, a heat pump water boiler has an integral housing comprising a refrigerant circulating circuit constituting a closed circuit by connecting a compressor, a radiator, pressure reducing means and an evaporator, thereby to circulate a refrigerant, a blower fan for blowing wind to the evaporator, a water-refrigerant heat exchanger for exchanging heat with the radiator, an inlet line connected to the water-refrigerant heat exchanger for supplying civil water, and a hot-water line connected for supplying the heated hot water to a hot-water terminal such as a faucet or a shower. A portion of the housing arranged flush with the suction face of the evaporator is provided with an extending portion so that the space for arranging parts in the boiler inside can be expanded. Since the evaporator or the parts in the refrigerant unit performs the heat exchange with the atmosphere outside of the boiler, the evaporator suction faces on the back and side faces of the boiler have to retain a predetermined space for retaining the draft of the blower fan, so that suction faces never fail to be retained at a distance from the wall faces when the boiler is installed. A portion of the housing is extended into that space portion within a range to exert no influence on the drafting performance, thereby to enlarge the inside space of the boiler. By forming that extending portion, the parts housing space in the body can be enlarged, although the volume required at the installation time is equal to the related one, thereby to make the heat pump water boiler more compact for better setting and maintaining properties.

DESCRIPTION OF REFERENCE NUMERALS AND SIGNS

Figure 1:
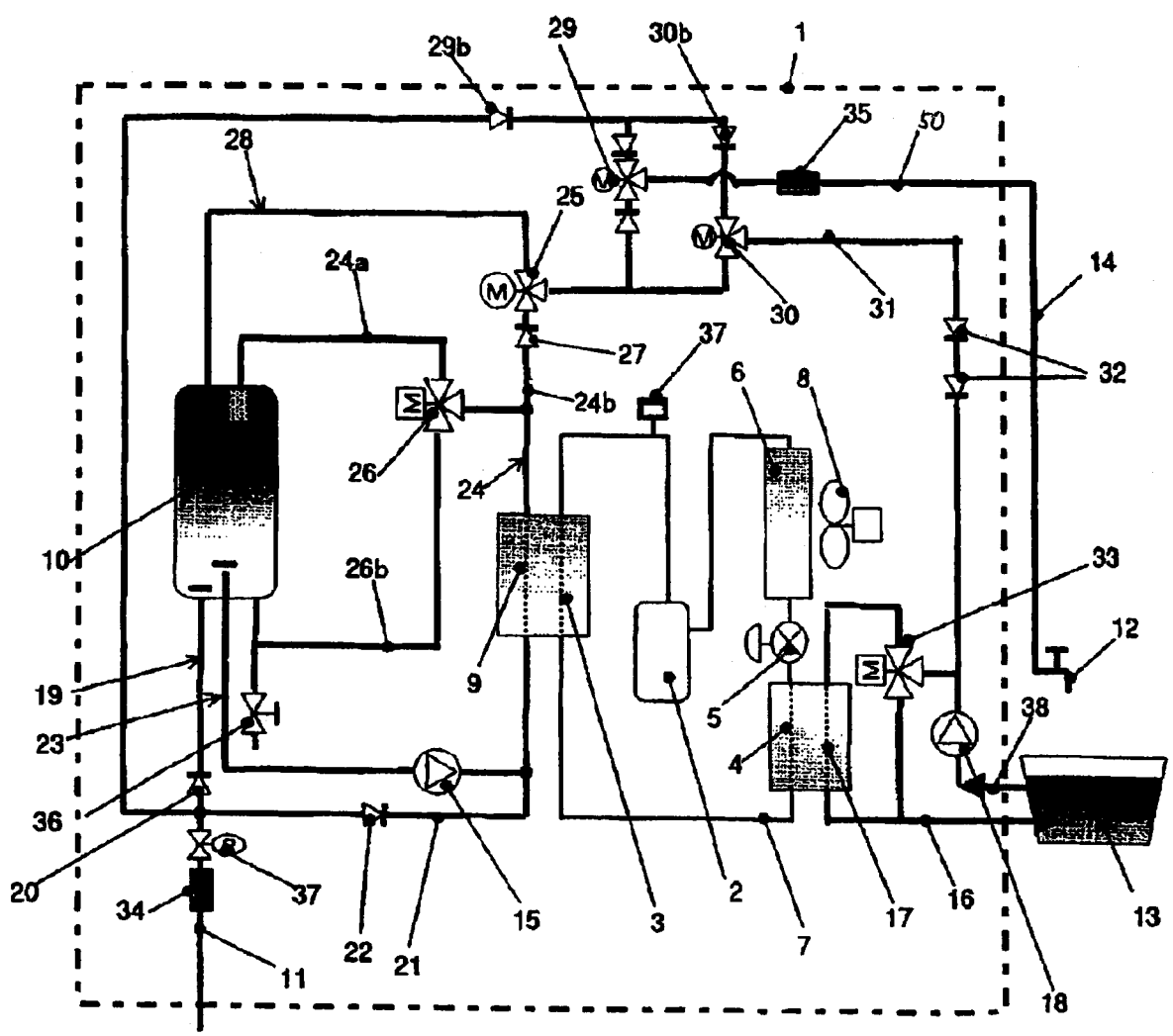
FIG. 1 A circuit configuration diagram of a heat pump water boiler in a first embodiment of the invention.

1 Body Unit
2 Compressor
3 Radiator (Hot-Water Supplying Water-refrigerant Heat Exchanger)
4 Radiator (Bath Warming/Heating Water-refrigerant Heat Exchanger)
5 Pressure Reducing Means
6 Evaporator
7 refrigerant Circulating Circuit
8 Blower Fan
9 Hot-Water Supplying Water-refrigerant Heat Exchanger
10 Hot-Water Reserving Tank
11 Inlet Line
12 Faucet (Hot-Water Supplying Terminal)
15 Hot-Water Supplying Circulation Water Pump
17 Bath Warming/Heating Water-refrigerant Heat Exchanger
18 Bath Water Circulating Pump
40a Jacket Extending Portion

BEST MODE FOR CARRYING OUT THE INVENTION

The heat pump water boiler according to the first mode of embodiment of the invention is characterized to have an integral housing comprising a refrigerant circulating circuit for circulating a refrigerant, a water-refrigerant heat exchanger for exchanging heat with a radiator of the refrigerant circulating circuit, and a hot-water reserving tank for reserving hot water heated.

The heat pump water boiler according to the second mode of embodiment of the invention has an integral housing comprising a refrigerant circulating circuit comprising a closed circuit by connecting a compressor, a radiator, pressure reducing means and an evaporator, thereby to circulate a refrigerant, a blower fan for blowing wind to the evaporator, a water-refrigerant heat exchanger for exchanging heat with the radiator, an inlet line connected to the water-refrigerant heat exchanger for supplying civil water, and a hot-water line connected for supplying the heated hot water to a hot-water terminal such as a faucet or a shower, wherein a portion of the housing arranged flush with the suction face of the evaporator includes an extending portion. As a result, the parts housing space in the body can be enlarged to make the heat pump water boiler more compact for better setting and maintaining properties.

In the heat pump water boiler according to the second mode of embodiment of the invention, according to the third mode of the invention, the extending portion has its extension size so set to the minimum size or less as not to deteriorate the heat exchanging performance of the evaporator. Although the volume required at the installation time is equal to the related one, the parts housing space in the body can be enlarged to make the heat pump water boiler more compact for better setting and maintaining properties.

In the heat pump water boiler according to the first to third modes of embodiment of the invention, according to the fourth mode of the invention, the hot-water reserving tank is arranged to confront the extending portion formed at a portion of the housing. As a result, the hot-water reserving tank can be moved backward by the extension size, and the parts housing space in the body can be enlarged to make the heat pump water boiler more compact for better setting and maintaining properties.

In the heat pump water boiler according to the first to fourth modes of embodiment of the invention, according to the fifth mode of the invention, the extending portion has a contour substantially identical to that of the hot-water reserving tank. As a result, even when a transverse load is applied to the boiler at the shipping time or at the installing time, the movement of the tank can be minimized to prevent the jacket from being dented or damaged to make the heat pump water boiler more workable.

In the heat pump water boiler according to the first to fifth modes of embodiment of the invention, according to the sixth mode of the invention, an insulator is interposed between the extending portion and the hot-water reserving tank. As a result, even when a transverse load is applied to the boiler at the shipping time or at the installing time, the insulator can play a role as the shock absorber to prevent the jacket more from being dented or damaged to make the heat pump water boiler workable.

In the heat pump water boiler according to the first to sixth modes of embodiment of the invention, according to the seven mode of the invention, a carbonic acid gas is used as the refrigerant. According to this mode of embodiment, the heat efficiency can be enhanced at the time of a hot water supply. At the same time, even if the refrigerant should leak to the outside, its influences upon the global warming can be made far lower than the refrigerant of R-410A used in the general air-conditioner, thereby to make the heat pump water boiler environmentally friendly and excellently recyclable.

EXAMPLE 1

An embodiment of the invention is described in the following with reference to the accompanying drawings. Here, this embodiment should not be construed to limit the invention.

FIG. 1 is a circuit configuration diagram of a heat pump water boiler in the first embodiment of the invention.

The heat pump water boiler of this embodiment is constituted to house a refrigerant cycle and a hot-water supply cycle integrally in a body unit 1. This refrigerant cycle is constituted by connecting a vertical type compressor 2 arranged in the body unit 1, a water supplying water-refrigerant heat exchanger 3 acting as a radiator, a bath warming water-refrigerant heat exchanger arranged in series with the water supplying water-refrigerant heat exchanger 3 and also acting as a heat exchanger, pressure reducing means 5 composed of an electric expansion valve, for example, and an evaporator composed of an L-shaped pneumatic heat exchanger, through a refrigerant line 7. A blower fan 8 is also provided for blowing a wind to the evaporator 6 to enhance the evaporative power.

On the other hand, the hot-water supply cycle is constituted to include a hot-water supplying water-refrigerant heat exchanger 9 (e.g., a heat exchanger of a double-pipe structure integrated with the radiator 3) for exchanging heat with the radiator 3 to turn civil water into hot water, a hot-water reserving tank 10 for reserving the hot water obtained by the hot-water supplying water-refrigerant heat exchanger 9, an inlet line 11 for introducing civil water into the hot-water reserving tank 10 and the hot-water supplying water-refrigerant heat exchanger 9, a hot-water supply line 14 for supplying the hot water from the hot-water reserving tank 10 or the hot-water supplying heat exchanger 9 to a hot-water supplying terminal such as a faucet 12 or a bath tab 13, a hot-water supplying circulation water pump for feeding water at a low temperature in the hot-water reserving tank 10, a bath heating line 16 for circulating and warming the warm water in the bath tab thereby to warm or additionally heat the hot water reserved in the bath tab 13, a bath warming/heating water-refrigerant heat exchanger 17 (e.g., a heat exchanger of a double-pipe structure integrated with the radiator 4) for heating the hot water in the bath tab connected to the bath heating line 16, and a bath water circulating pump 18 for circulating the hot water in the bath tab.

The constitution of the water supply cycle is further described.

A tank inlet line 19 supplies the civil water from the inlet line 11 to the hot-water reserving tank 10, and is provided in its midway with a tank inlet check valve 20. A civil-water supply line 21 supplies the civil water from the inlet line 11 directly to the hot-water water-refrigerant heat exchanger 9, and is provided with a check valve 22. A heat-exchanging water supply line 23 feeds cold water reserved in the hot-water reserving tank 10, from the hot-water reserving tank 10 to the hot-water supplying water-refrigerant heat exchanger 9, when the hot-water supplying circulation water pump 15 is driven. A hot-water reserving line 24 feeds the civil water warmed by the hot-water supplying water-refrigerant heat exchanger 9, to the hot-water reservation tank 10 or a supply mixing valve 25, and has its hot-water reservation tank side line 24a provided midway with a hot-water reservation solenoid valve 26 and its supply mixing valve side line 24b provided midway with a check valve A 27.

On the other hand, a tank hot-water supply line 28 supplies hot water (usually at 60° C. to 90° C.) from the hot-water reservation tank 10 to the supply mixing valve 25. This supply mixing valve 25 mixes the hot water or water coming from the hot-water reserving line 24 (or its supply mixing valve side line 24b) and the tank hot-water supply line 28. The check valve A 27 is disposed upstream of the supply mixing valve 25. Moreover, a hot-water mixing valve 29 mixes the hot water having passed through the supply mixing valve 25 and the civil water supplied from the inlet line 11 to supply hot water at a proper temperature to the faucet 12. A check valve 29b for preventing a back flow is interposed between the hot-water mixing valve 29 and the inlet line 11. Moreover, the hot water adjusted to the optimum temperature by the hot-water mixing valve 29 is added through a hot-water supply line 50 and the hot-water supply line 14 to the faucet 12 or the bath tab 13.

On the other hand, an inlet flow meter 34 is a meter for measuring the inlet flow rate, and a supply flow meter 35 is a meter for measuring the supply flow rate. A drain valve 36 is used for draining the water in the tank so as to preventing the freezing, in case no use continues for a long time in a cold district. A control valve 37 controls the inlet flow rate.

A more description is made on a bath warming/heating cycle. The bath warming/heating water-refrigerant heat exchanger 4 is arranged on the downstream side, as viewed from the compressor of the hot-water supplying water-refrigerant heat exchanger 3 connected in series in a refrigerating cycle. Numeral 38 designates a bath inlet line for introducing the hot water from the bath tab 13 when the bath water circulating pump 18 is driven. The hot water in the bath, which has been introduced from the bath inlet line 38, is heated by the bath warming/heating water-refrigerant heat exchanger 17 and is returned again through the bath heating line 16 to the bath tab 13 thereby to perform the warming run for keeping the bath at a constant temperature and the heating run for raising the bath temperature without adding the hot-water content in the bath tab.

Moreover, a control device 39 is means for detecting the refrigerant temperature on the high-pressure side of the refrigerant cycle, to judge the rising state of the refrigerant circulation cycle from the level of the temperature thereby to control the degree of opening of the supply mixing valve 25 or the hot-water mixing valve 29.

Next, the arrangement and constitution of the individual elements of the refrigerant cycle and the hot-water supply cycle, which are integrally housed in the body unit 1, are described with reference to FIG. 2 and FIG. 3.

Figure 2:
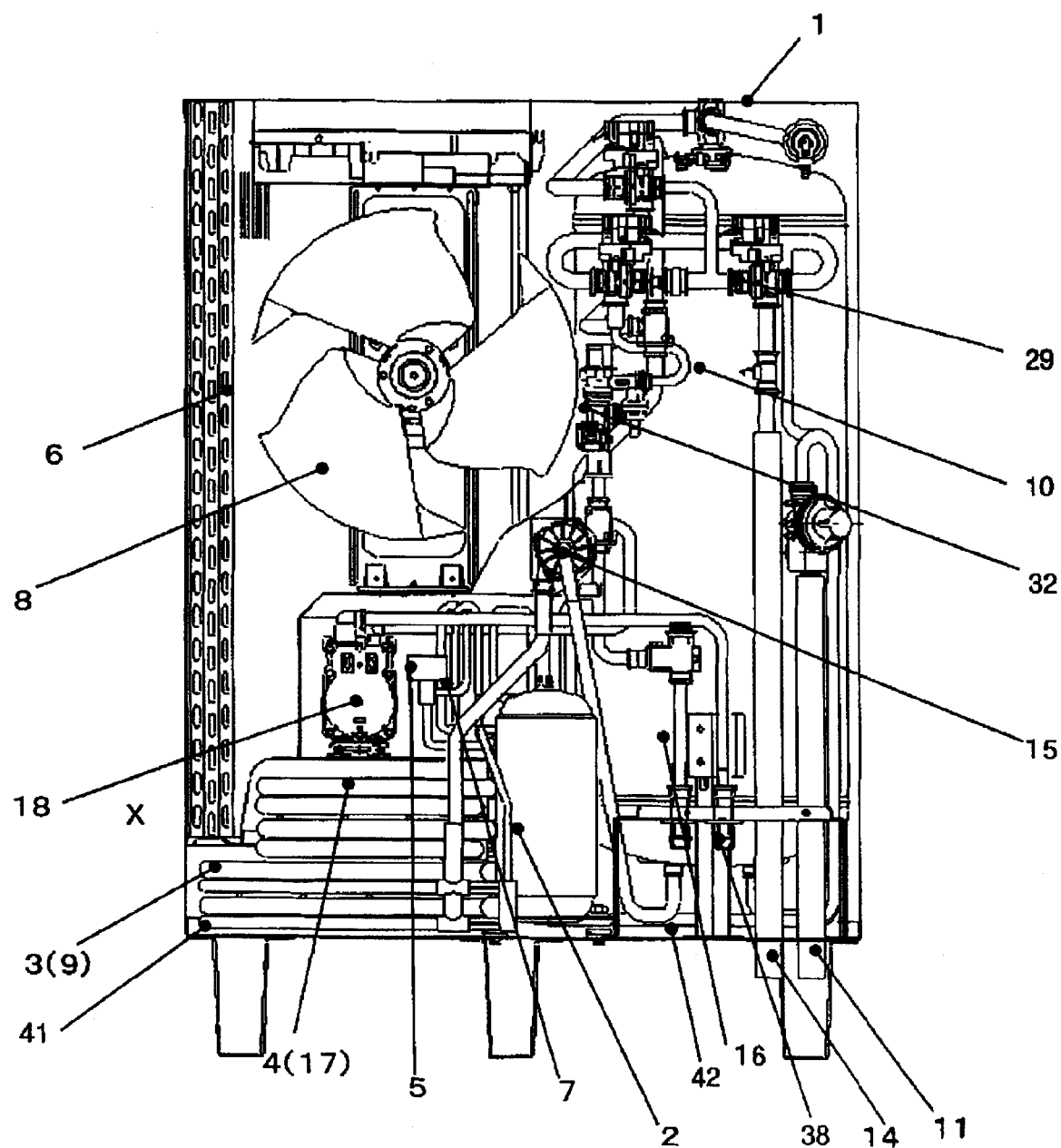
FIG. 2 A front elevation showing the inside of the heat pump water boiler shown in FIG. 1.

FIG. 2 is a front elevation showing the inside of the heat pump water boiler shown in FIG. 1, and is a perspective view of the body unit 1 cut vertically and taken from the front.

In the body unit 1, there are arranged the vertical type compressor 2, the radiator 3 (or the hot-water supplying water-refrigerant heat exchanger 9), the radiator 4 (or the bath warming/heating water-refrigerant heat exchanger 17) made smaller than and placed over the radiator 3 (or the hot-water supplying water-refrigerant heat exchanger 9), the evaporator 6, the blower fan 8, the hot-water supplying circulation water pump 15 and the bath water circulating pump 18. Moreover, the hot-water reserving tank 10 is arranged on the right side (i.e., the other side of the body unit 1) of the evaporator 6 and the compressor 2. Still moreover, the inlet line 11 and the hot-water supply line 14 are arranged in front of the hot-water reserving tank 10. All of these components are integrated and housed in the body unit 1.

Figure 3:
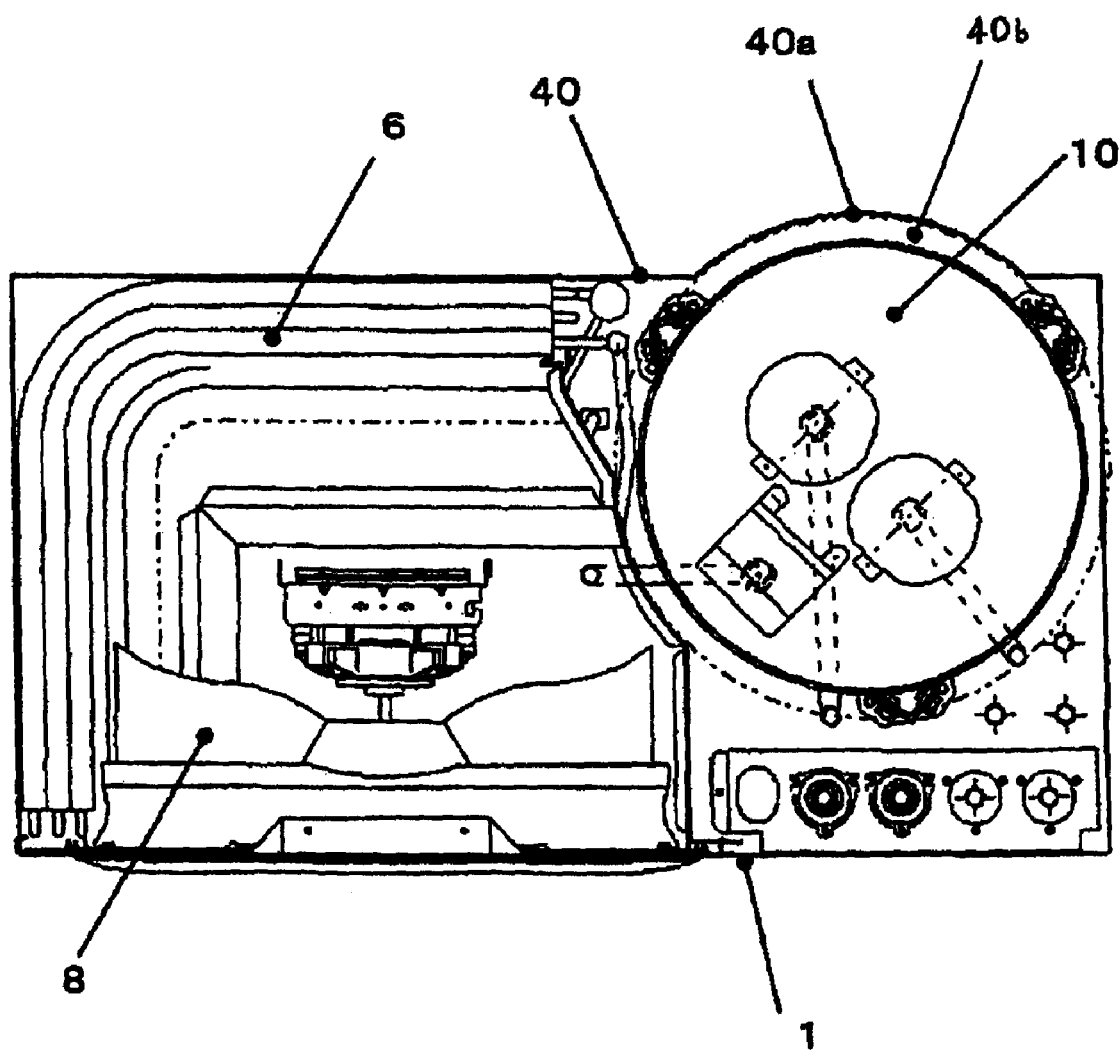
FIG. 3 A top plan view showing the inside of the heat pump water boiler shown in FIG. 1.
Figure 4:
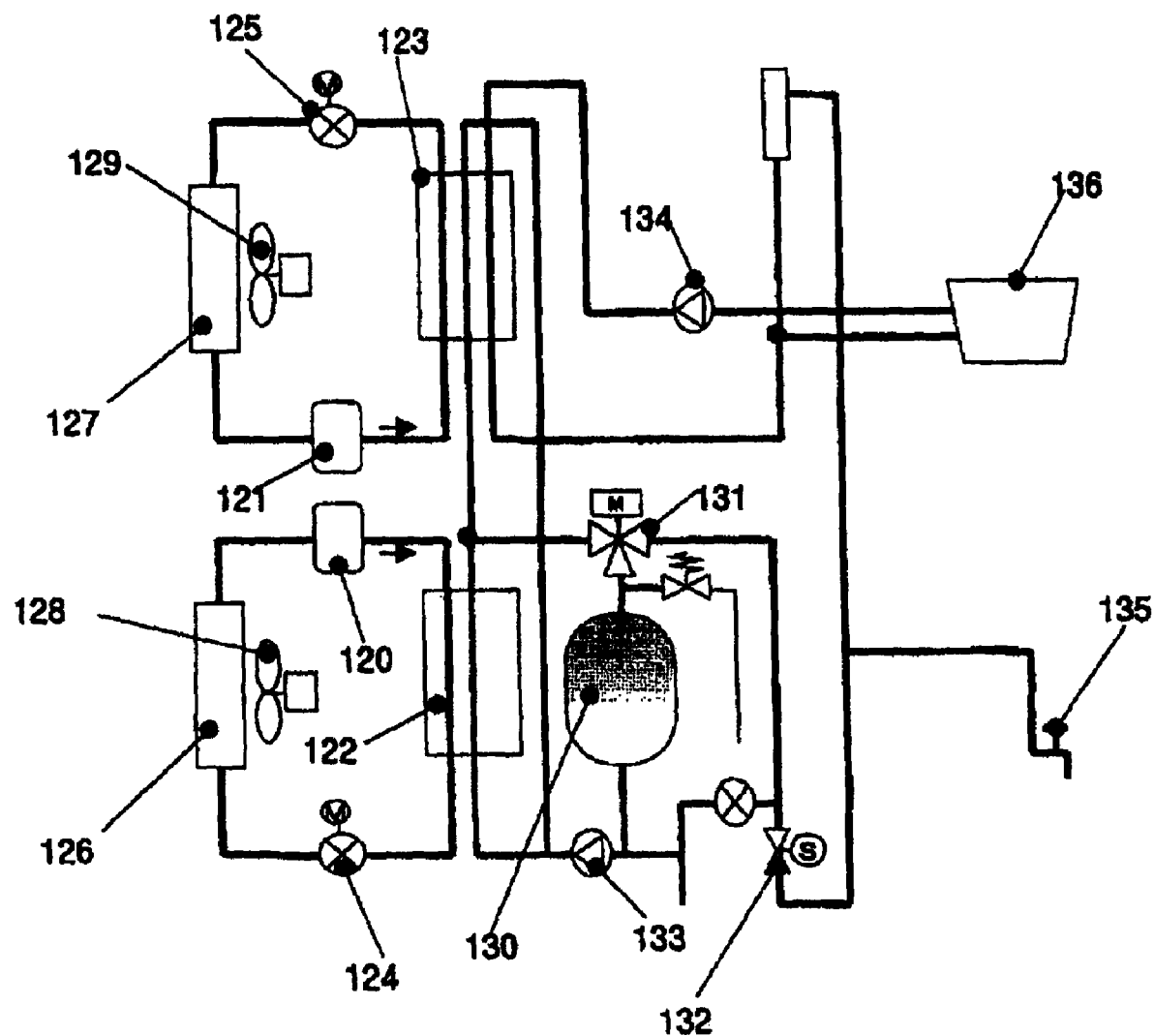
FIG. 4 A circuit configuration diagram of a heat pump water boiler of the related art.
Figure 5:
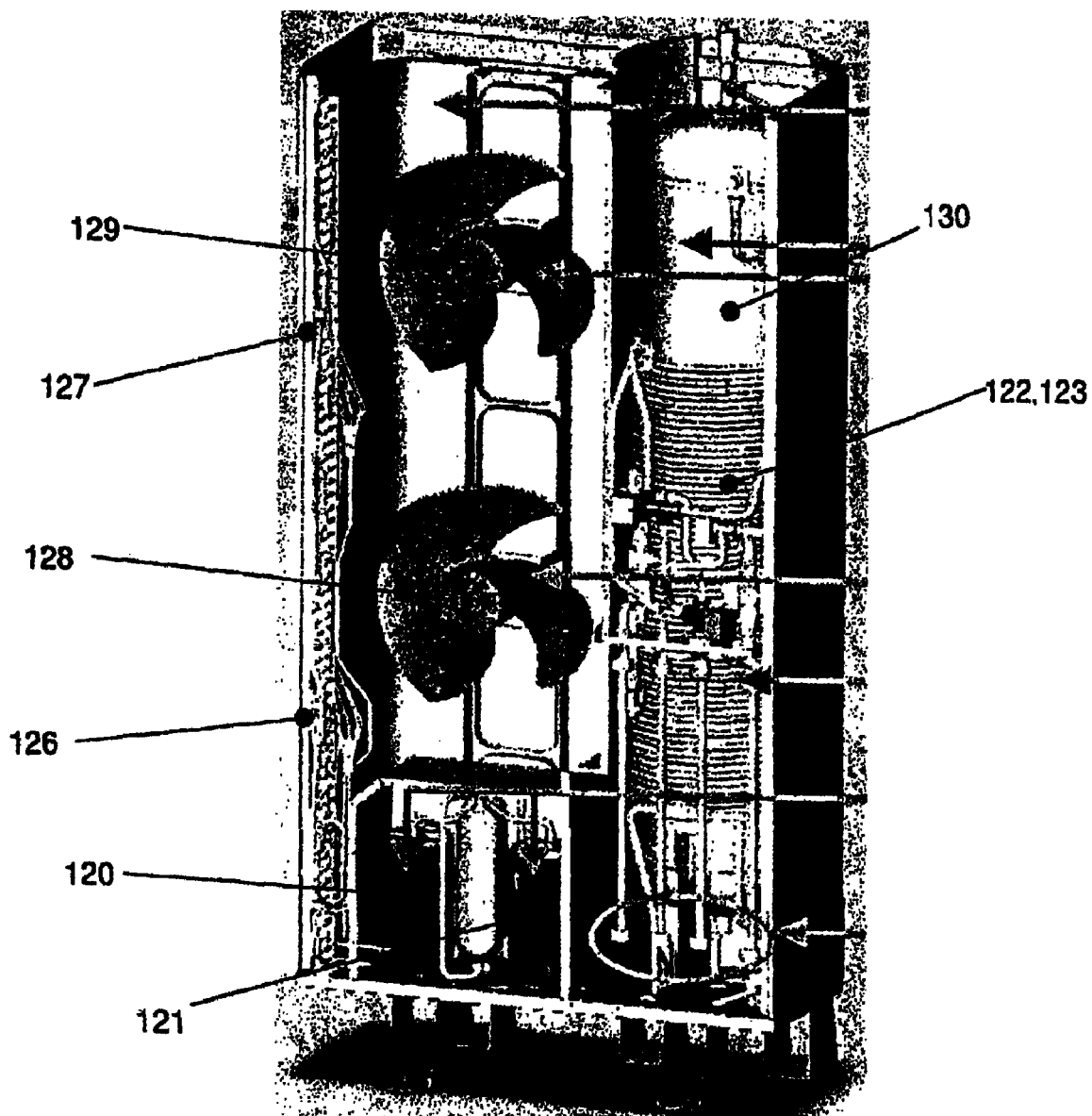
FIG. 5 A front elevation showing the inside of the heat pump water boiler (or the heat pump unit) of the related art.
Figure 6:
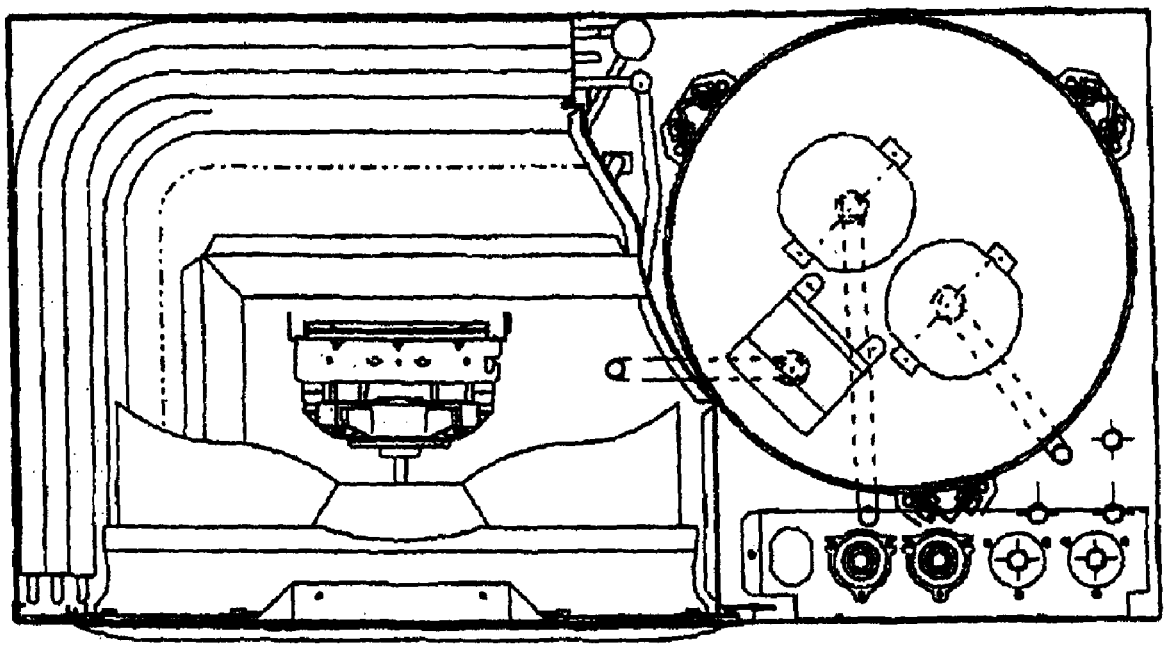
FIG. 6 A top plan view showing the inside of the heat pump water boiler (or the heat pump unit) of the related art.

FIG. 3 is a top plan view showing the inside of the heat pump water boiler shown in FIG. 1, and is a perspective view of the body unit 1 cut horizontally and taken from the above.

The evaporator 6 and the blower fan 8 are placed on the left side of the body unit 1, and the hot-water reserving tank 10 is placed on the right side. A back jacket 40 confronting the hot-water reserving tank 10 is provided at its portion with an extending portion 40a having a contour substantially identical to that of the hot-water reserving tank 10. An insulator 40b is mounted in the space portion between the hot-water reserving tank and the jacket extending portion 40a so that it is given a function as the shock absorber thereby to retain the safety of the hot-water reserving tank 10 when the body is shipped.

By forming that extending portion 40a, the parts housing space in the body can be enlarged to make the heat pump water boiler more compact for better setting and maintaining properties.

Moreover, that extending portion 40a retains a predetermined space with a view to preventing the evaporator 6 from being mounted in close contact with an obstacle such as the wall face when the body unit 1 integrated is disposed. The extending portion 40a has its extension size so set to the minimum size or less as not to deteriorate the heat exchanging performance of the evaporator 6.

The actions of the heat pump water boiler thus far described are explained with reference to the drawings.

When the compressor 2 is driven, the refrigerant compressed to a high pressure and discharged is fed to the radiator 3 (or the water-refrigerant heat exchanger 9) so that it radiates the heat by exchanging the heat with the civil water fed through the civil-water supply line 21. As a result, the civil water flowing through the hot-water reserving line 24 and the supply mixing valve 25 is heated to a high temperature. The refrigerant to flow out from the radiator 3 (or the water-refrigerant heat exchanger 9) is decompressed and expanded by the pressure reducing means 5 and is fed to the evaporator 6, in which it exchanges the heat with the air fed by the blower fan 8 so that it is gasified to evaporate while it is passing through the evaporator 6. This gasified refrigerant is sucked again into the compressor 2 to repeat the compression stroke again, so that the civil water thus gradually heated is fed to the bath tab 13 through the hot-water supply line 50, the hot-water supply line 14 and the faucet 12.

At this time, the refrigerant cycle is late in rise and inferior in quick warming properties. This late rise is compensated by the hot-water reserving tank 10. Before the refrigerant cycle rises to establish a predetermined hot-water supply temperature, the hot water having passed through a tank hot-water supply line 28 is mixed by the supply mixing valve 25 with the water (or the water having a temperature gradually raised to a high level), which has passed through the hot-water supplying water-refrigerant heat exchanger 9 and is still cold, and further mixed by the hot-water mixing valve 29 with the civil water having passed through the inlet line 11, so that the hot water at a temperature desired by the user can be supplied.

Next, when the refrigerant circulating circuit rises, the opening of the supply mixing valve 25 is adjusted to mix the hot water from the hot-water reserving tank 10 and the warm water from the radiator 3 (or the hot-water supplying water-refrigerant heat exchanger 9), to a proper temperature. The hot water thus mixed is further mixed by the hot-water supplying mixing valve 29 with the civil water having passed through the inlet line 11 so that it is supplied.

Finally, not the hot water having passed from the hot-water reserving tank 10 through the tank hot-water supply line 28, but the hot water obtained by heating the civil water having passed through the civil-water supply line 21 by the hot-water supplying water-refrigerant heat exchanger 9 of the refrigerant cycle is mixed with the civil water having passed through the inlet pipe 11 by the hot-water supplying mixing valve 29, so that the hot water at the predetermined temperature is supplied. In short, the control device 39 makes the controls to grasp the rising state of the refrigerant cycle, to adjust the openings of the supply mixing valve 25 and the hot-water supplying mixing valve 29, and to supply the hot water at the predetermined temperature to the hot-water supplying terminal.

When the user closes the faucet 12 or when the bath tab 13 has a proper amount of hot water so that it need any more supply, the hot-water supplying circulation water pump 15 is driven, and the hot-water reservation solenoid valve 26 is opened to perform the hot-water reserving run, in which the hot-water reserving tank 10 is supplied with the hot water for the next hot-water supplying run.

Thus, in response to the rising state of the refrigerant cycle, either the hot water reserved in the hot-water reserving tank 10 is supplied to the hot-water supplying terminal, or the hot water heated in the hot-water supplying water-refrigerant heat exchanger 9 but not through the hot-water reserving tank 10 can be supplied directly to the hot-water supplying terminal. According to this embodiment, therefore, the real-time hot-water supply can be got to retain the quick hot-water supply to supply the user, when desired, with the hot water thereby to provide a highly usable heat pump water boiler. By retaining this quick hot-water supply, in other words, the capacity of the hot-water reserving tank can be made smaller than that of the hot-water reservation type heat pump water boiler thereby to improve the installation remarkably, to cut the cost and to improve the usability.

The civil water to flow through the hot-water reserving line 24 and the supply mixing valve 25 is heated to a high temperature. The refrigerant to flow out from the radiator 3 (or the water-refrigerant heat exchanger 9) is decompressed and expanded by the pressure reducing means 5 and is fed to the evaporator 6, in which it exchanges the heat with the air fed by the blower fan 8 so that it is gasified to evaporate while it is passing through the evaporator 6. This gasified refrigerant is sucked again into the compressor 2 to repeat the compression stroke again, so that the civil water thus gradually heated is fed to the bath tab 13 through the hot-water supply line 50, the hot-water supply line 14 and the faucet 12.

When the water temperature drops, the warming run or the heating run is performed. When the drop of the hot-water temperature of the bath tab 13 is detected in the warming run, the bath water circulating pump 18 acts to feed the hot water of the bath tab 13 to the radiator 4 (or the bath warming/heating water-refrigerant heat exchanger 17). When the compressor 2 is run, the refrigerant compressed to a high pressure and discharged is fed to the radiator 4 (or the bath warming/heating water-refrigerant heat exchanger 17), and exchanges the heat with the hot water of the bath tab 13 having passed through the bath water circulating pump 18 so that it radiates the heat. As a result, the warming run is performed by heating and returning the hot water through the bath heating line 16 to the bath tab 13. When the temperature of the hot water in the bath tab 13 seriously drops so that it is desired to rise without adding any hot water, the heating run is performed. In this run, too, the bath water circulating pump 18 acts to feed the hot water of the bath tab 13 to the radiator 4 (or the bath warming/heating water-refrigerant heat exchanger 17). When the compressor 2 is run, the refrigerant compressed to a high pressure and discharged is fed to the radiator 4 (or the bath warming/heating water-refrigerant heat exchanger 17), and exchanges the heat with the hot water of the bath tab 13 having passed through the bath water circulating pump 18 so that it radiates the heat. As a result, the heating run is performed by heating and returning the hot water of the bath tab through the bath heating line 16 to the bath tab 13.

On the other hand, this embodiment employs the heat pump water boiler using a carbonic acid gas as the refrigerant. As a result, the refrigerant circulating circuit is a supercritical one, in which the pressure of the refrigerant becomes the critical pressure or higher, and is constituted such that the water to flow through the water flow passage of the refrigerant-water heat exchanger is heated by the refrigerant raised to the critical pressure or higher. The refrigerant to flow in the radiator of the refrigerant-water heat exchanger is pressurized by the compressor to the critical pressure or higher so that the refrigerant is not condensed even if its heat is lost to a lower temperature by the water flow of the water passage of the refrigerant-water heat exchanger, but a temperature difference can be easily established between the refrigerant and the water all over the refrigerant-water heat exchanger thereby to provide hot water in a high heat exchanging efficiency. Since the refrigerant is carbonic acid gas, moreover, its influences upon the global warming can be made far lower, even if it should leak to the outside, than the refrigerant of R-410A used in the general air-conditioner, thereby to provide an environmentally friendly heat pump water boiler.

The present invention has been described in detail in connection with the specific mode of embodiment. It is, however, apparent to those skilled in the art that various modifications or corrections could be made without departing from the spirit and scope of the invention.

The present patent application is based on Japanese Patent Application No. 2004-269611, filed on Sep. 16, 2004, the contents of which are incorporated herein as references.

INDUSTRIAL APPLICABILITY

Thus, the present invention is applied to a heat pump water boiler for boiling water in the heat pump cycle and supplying hot water, and is suited for an instantaneous water boiler for a home use or a hot-water supplier for a business use.

The invention claimed is:

1. A heat pump water boiler having an integral housing comprising:
   a refrigerant circulating circuit comprising a closed circuit by connecting a compressor, a radiator, a pressure reducing unit and an evaporator, thereby to circulate a refrigerant;
   a blower fan for blowing wind to the evaporator;
   a water-refrigerant heat exchanger for exchanging heat with the radiator;
   a hot-water reserving tank;
   an inlet line connected to the water-refrigerant heat exchanger for supplying civil water; and
   a hot-water line connected for supplying the heated hot water to a hot-water terminal such as a faucet or a shower,
   wherein a portion of the housing includes a first surface that is arranged flush with a suction face of the evaporator and that includes an extending portion protruding out of the first surface, and
   wherein the hot-water reserving tank is arranged to confront the extending portion formed at a portion of the housing.

2. The heat pump water boiler according to claim 1, wherein the extending portion has extension size thereof so set to the minimum size or less as not to deteriorate the heat exchanging performance of the evaporator.

3. The heat pump water boiler according to claim 1, wherein the extending portion has a contour substantially identical to that of the hot-water reserving tank.

4. The heat pump water boiler according to claim 1, wherein an insulator is interposed between the extending portion and the hot-water reserving tank.

5. The heat pump water boiler according to claim 1, wherein the refrigerant comprises a carbonic acid gas.

6. The heat pump water boiler according to claim 1, wherein the heated hot water can be supplied to the hot-water line without passing through the hot water reserving tank.

* * * * *

UNITED STATES PATENT AND TRADEMARK OFFICE
CERTIFICATE OF CORRECTION

| | | |
|---|---|---|
| PATENT NO. | : 7,748,227 B2 | Page 1 of 1 |
| APPLICATION NO. | : 11/573271 | |
| DATED | : July 6, 2010 | |
| INVENTOR(S) | : Toshikatsu Fukunaga et al. | |

It is certified that error appears in the above-identified patent and that said Letters Patent is hereby corrected as shown below:

In column 2, line 41, please delete the phrase "as set forth in claim 1" after the word invention, In column 5, line 29, please insert the number --4-- after the word -exchanger- and before the word -arranged-, In column 5, line 33, please insert the number --6-- after the word -evaporator-, In column 5, line 51, please insert the number --15-- after the word -pump- and before the word -for-, In column 7, line 21, please insert the number --10-- after the word -tank- and before the word -and-, In column 8, line 39, please insert the number --10-- after the word -tank- and before the word -can-.

Signed and Sealed this

Sixteenth Day of November, 2010

David J. Kappos
*Director of the United States Patent and Trademark Office*